United States Patent [19]

Lazarus

[11] Patent Number: 4,518,013

[45] Date of Patent: May 21, 1985

[54] PRESSURE COMPENSATING WATER FLOW CONTROL DEVICES

[76] Inventor: John H. Lazarus, 7 Ohlsson Way, Newlands, Cape Town, Cape Province, South Africa

[21] Appl. No.: 444,977

[22] Filed: Nov. 29, 1982

[30] Foreign Application Priority Data

Nov. 27, 1982 [ZA] South Africa .................. 81/8267

[51] Int. Cl.³ .............................................. F15C 1/16
[52] U.S. Cl. ................................. 137/811; 137/810; 137/833; 137/841
[58] Field of Search ............. 137/808, 810, 811, 833, 137/841

[56] References Cited

U.S. PATENT DOCUMENTS 3,238,960  3/1966  Hatch, Jr. .................... 137/811
3,373,759  3/1968  Adoms ......................... 137/810
3,709,243  1/1973  Wieme ......................... 137/833

FOREIGN PATENT DOCUMENTS 1213871  11/1970  United Kingdom ............... 137/810

Primary Examiner—A. Michael Chambers
Attorney, Agent, or Firm—Christie, Parker & Hale

[57] ABSTRACT

A pressure compensating, water flow control device in which the incoming water is split between first and second flow paths. The first flow path is in the form of a closed loop and the second flow path includes a vortex chamber. The outlet from the device is co-axial with said vortex chamber. Both ends of the closed loop communicate with an inlet zone. The vortex chamber is, in one form, connected to said inlet zone by a passage and, in another form, said chamber and said inlet zone are contiguous.

11 Claims, 4 Drawing Figures

PRESSURE COMPENSATING WATER FLOW CONTROL DEVICES

BACKGROUND TO THE INVENTION

Agricultural irrigation systems are widely used as part of the continuing effort to produce more food on the available agricultural land. A major requirement of a successful irrigation system is that it must be possible to determine reasonably accurately how much water has been applied to the land. If too little is applied then there is the likelihood of a yield which is below that which could otherwise be expected. If too much is applied there is certainly a wastage of water and there is also a possibility that overwatering will also lower the yield.

With commercially available non-pressure compensating irrigation emitters (emitters come in the form of sprinklers or drippers), the rate of flow through an emitter at a particular pressure can obviously be determined by calculation or experimentally. Unfortunately, in many irrigation systems, inlet pressure varies widely due mainly to differences in elevation but also with time. With simple non-pressure compensating emitters, the rate of flow varies very substantially with changes in pressure.

In order to overcome this problem, quite complex emitters have been proposed which are sensitive to pressure variations and which, by bringing orifices of different sizes into use, usually by diaphragms or springs, compensate for changes in pressure. Such emitters are delicate and consequently prone to damage by the environment and when handled by manual labourers in the field.

The object of the present invention is to provide a pressure compensating, water flow control device which is simple in construction and provides a rate of water flow which is substantially constant regardless of inlet pressure.

BRIEF DESCRIPTION OF THE INVENTION

According to the present invention there is provided a pressure compensating, water flow control device, the device comprising an inlet leading into an inlet zone, a first flow path in the form of a closed loop both ends of which communicate with said inlet zone, and a second flow path leading from said inlet zone and comprising a vortex chamber, there being an outlet from the vortex chamber.

In one constructional form, the vortex chamber is of cylindrical form with an opening in the peripheral wall thereof placing the vortex chamber directly in communication with said inlet zone. In a further constructional form, said vortex chamber is also of cylindrical form, there being an inlet passage leading from said inlet zone to said vortex chamber, the inlet passage communicating tangentially with said vortex chamber. The outlet can be co-axial with the vortex chamber and in an end wall thereof so that, during use of the device, it lies at the centre of the low pressure region of the vortex.

Said one constructional form can comprise first walls bounding the inlet, second walls bounding an inlet end of the closed loop and third walls bounding an outlet end of the closed loop, the first and third walls being transverse to one another so that water emerging from the loop intersects water flowing across the inlet zone from said inlet to the inlet end of the closed loop, there being a flow splitter for directing a portion of the incoming water into the first flow path and a further portion into the second flow path.

In said further constructional form, an inlet end of said closed loop can be on the opposite side of said inlet zone to said inlet, an outlet end of the closed loop being located to one side of a line traversing the inlet zone and joining said inlet and said inlet end, water which, in use, flows from said outlet end intersecting water flowing from said inlet to said inlet end, and said second flow path communicating with said inlet zone between said inlet end and said outlet end and on the same side of said line as said outlet end.

If desired there can be means in said closed loop for causing turbulent flow. Such means can be constituted by, for example, a plurality of teeth protruding from the walling bounding said closed loop.

BRIEF DESCRIPTION OF THE DRAWINGS

For a better understanding of the present invention, and to show how the same may be carried into effect, reference will now be made, by way of example, to the accompanying drawings in which.

DETAILED DESCRIPTION OF THE DRAWINGS

Figure 1:
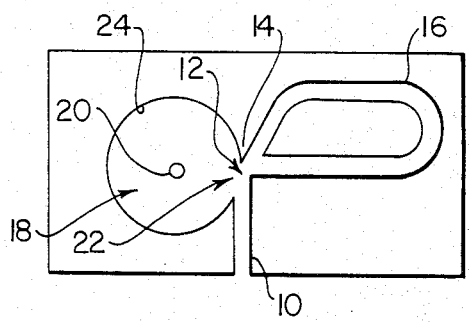
FIG. 1 is a diagrammatic plan view of a pressure compensating, water flow control device in accordance with the present invention.
Figure 2:
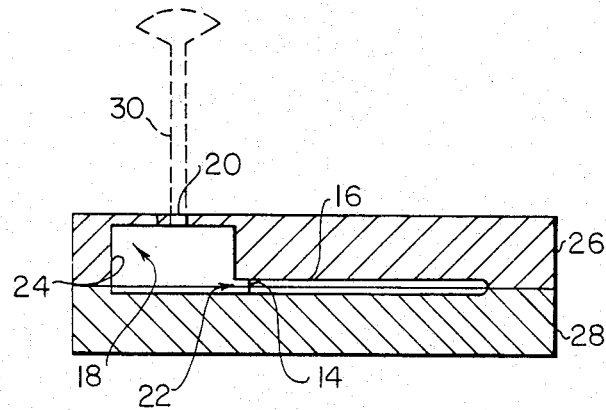
FIG. 2 is a vertical section through the device of FIG. 1.

The pressure compensating, water flow control device illustrated in FIGS. 1 and 2 has a water inlet at 10, the inlet leading into an inlet zone 12. On the opposite side of the inlet zone 12 to the inlet 10 there is a flow splitter 14 of wedge-like form. A closed loop 16 extends from the inlet zone 12 back to the inlet zone 12. A vortex chamber is generally indicated at 18, the chamber 18 being of cylindrical form and having an outlet 20 in one of the end walls thereof. Communication between the contiguous chamber 18 and inlet zone 12 is by way of an opening 22 in the cylindrical side wall 24 of the chamber 18. Water entering the chamber 18 does so tangentially and swirls in the chamber.

A second outlet could if desired be provided in the other end of the chamber 18. The possibility of providing more than one outlet in an end wall or of providing an outlet in a side wall also arises.

As best shown in FIG. 2, the device comprises two blocks 26 and 28. One face of each block is formed with depressions, the depressions being arranged so that when the blocks are brought into face-to-face relationship and secured together, the matching depressions form the inlet, the inlet zone, the vortex chamber and the closed loop.

It will be noted that the walls bounding the inlet 10 in the region of the zone 12 are substantially at right angles to the walls bounding the exit from the closed loop 16. Thus water flowing from the closed loop intersects water flowing across the inlet zone from the inlet to the entrance to the closed loop.

A sprinkler or dropper diagrammatically shown at 30 is attached to the outlet 20 so as to distribute, in the desired pattern, water emerging from the device.

Experimental work has shown that increasing water pressure at the inlet 10 initially results in an increased rate of flow through the outlet 20. At a particular pressure, which depends on the configuration of the flow paths within the device, the rate of change of flow through the outlet 20 increases less rapidly with increasing pressure.

It is believed that, at low inlet pressures, there is only a low rate of flow around the closed loop 16 and that very little energy is dissipated as a result of flow in the closed loop. As the pressure at the inlet 10 increases, there is a corresponding increase in flow rate in the closed loop and this in turn results in greater energy losses in the loop. Experimental work has shown that, at above a certain pressure, air is cyclically drawn into the outlet 20, this temporarily reducing the water flow area of the outlet and resulting in pulsating flow. It is believed that pressure waves resulting from this pulsating flow travel around the closed loop 16. The effect of this in turn seems to be that the pulsating effect at the outlet 20 is accentuated.

While the manner in which the device operates is still unclear, it is possible to demonstrate experimentally that the relationship between inlet pressure and rate of flow is more desirable than that of non-pressure compensating emitters.

Figure 3:
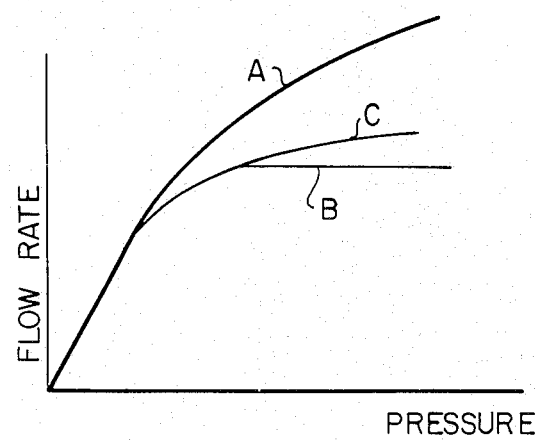
FIG. 3 is a graph.

Line A in FIG. 3 indicates the change in flow rate with increasing pressure that is characteristic of simple non-pressure compensating sprinklers and droppers that are commercially available. Line B indicates the ideal curve ie a constant flow rate at all pressures above a minimum pressure. Line C is the curve which has been achieved experimentally with the device of FIGS. 1 and 2.

Figure 4:
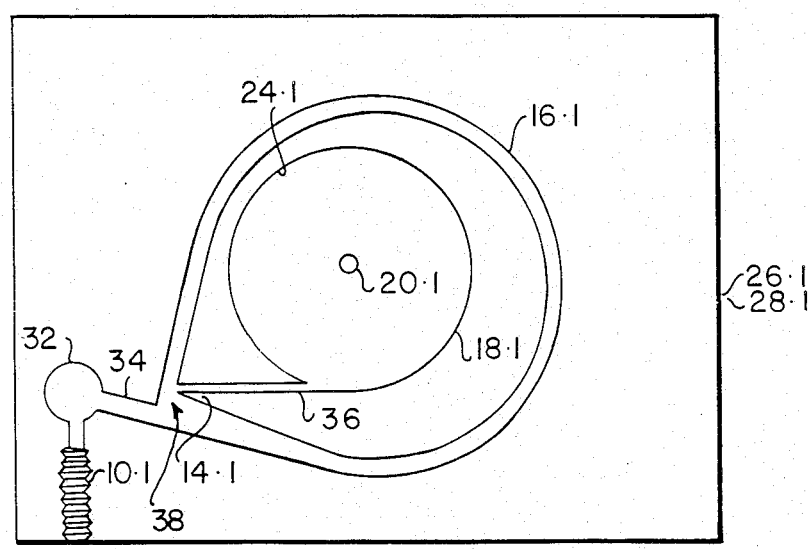
FIG. 4 is a diagrammatic plan view of a further form of pressure compensating, water flow control device.

Referring now to FIG. 4, the pressure compensating, water flow control device illustrated has much in common with that illustrated in FIG. 1 and, where applicable, like reference numerals have been employed with the addition of the suffix '0.1'.

The inlet 10.1 leads into an inlet chamber 32 and a passage 34 leads out of the chamber 32 towards the junction between the closed loop 16.1 and the inlet passage 36 to the vortex chamber 18.1. The flow splitter 14.1 lies between the passage 36 and the inlet end of the loop 16.1.

Water entering by way of the inlet 10.1 flows through the chamber 32 and passage 34 into the zone designated 38. At relatively low pressures, there appears to be little flow in the loop 16.1. Instead, the bulk of the incoming water flows through the passage 36 and enters the vortex chamber 18.1 tangentially, swirls in the vortex chamber 18.1 and emerges through the outlet 20.1.

As inlet pressure increases, an increasing proportion of the incoming water appears to flow in the closed loop 16.1 and the same pulsating effect as is described above commences. While the operation of the device is still not entirely understood, it does appear that the water emerging from the loop 16.1 and flowing into the zone 38, has the effect of 'switching' flow from the passage 36 into the closed loop 16.1 particularly at higher pressures. The pulsations cause the spray pattern to collapse and be re-established, and this in turn enhances the even distribution of the water. Even after an apparently steady state has been created within the device at higher pressures, there is still the tendency for the spray to collapse periodically as air is drawn through the outlet 20.1 into the centre of the vortex. Thus, even when steady flow conditions are apparently existing within the device, there is a pulsating effect at the outlet 20.1.

It is believed that the effect within the splitting section of the device is similar to the Coanda effect in fluidics. This is, at this stage, conjecture. However a pressure/flow rate curve approximately as designated at C in FIG. 3 can be obtained experimentally without the use of any moving parts. The curve obtained using the device of FIG. 4 is slightly flatter, and thus closer to ideal, than the curve C obtained using the FIGS. 1 and 2 device.

I claim:

1. A pressure compensating, water flow control device comprising an inlet leading into an inlet zone, a first flow path in the form of closed loop both ends of which communicate with said inlet zone, and a second flow path leading from said inlet zone and comprising a vortex chamber, there being an outlet from the vortex chamber, the first and second flow paths being discrete so that water entering the first flow path can only reach the second flow path by flowing entirely around said closed loop and re-entering the inlet zone, first walls bounding the inlet, second walls bounding an inlet end of the closed loop and third walls bounding an outlet end of the closed loop, the first and third walls being transverse to one another so that water emerging from the loop intersects water flowing across the inlet zone from said inlet to the inlet end of the closed loop, there being a flow splitter for directing a portion of the incoming water into the first flow path and a further portion into the second flow path.

2. A device according to claim 1, in which said vortex chamber is of cylindrical form with an opening in the peripheral wall thereof placing the vortex chamber directly in communication with said inlet zone.

3. A device according to claim 1, in which said vortex chamber is of cylindrical form, there being an inlet passage leading from said inlet zone to said vortex chamber, the inlet passage communicating tangentially with said vortex chamber.

4. A device according to claim 3, in which said outlet is co-axial with the vortex chamber and in an end wall thereof.

5. A device according to claim 3, in which said outlet is co-axial with the vortex chamber and in an end wall thereof.

6. A device according to claim 1, in which the first and third walls are at right angles to one another.

7. A device according to claim 1, in which the vortex chamber is in direct fluid communication with the inlet zone so that a portion of the water entering the inlet passes into the closed loop while a remaining portion passes into the vortex chamber.

8. A pressure compensating, water flow control device comprising an inlet leading into an inlet zone, a first flow path in the form of a closed loop both ends of which communicate with said inlet zone, and a second flow path leading from said inlet zone and comprising a vortex chamber, there being an outlet from the vortex chamber, in which an inlet end of said closed loop is on the opposite side of said inlet zone to said inlet, an outlet end of the closed loop being located to one side of a line traversing the inlet zone and joining said inlet and said inlet end, water which, in use, flows from said outlet and intersecting water flowing from said inlet to said inlet end, and said second flow path communicating with said inlet zone between said inlet end and said outlet end and on the same side of said line as said outlet end, and in which the closed loop encircles the vortex chamber and is spaced radially outwardly therefrom.

9. A pressure compensating, water flow control device comprising an inlet leading into an inlet zone, a first flow path in the form of a closed loop both ends of which communicate with said inlet zone, and a second flow path leading from said inlet zone and comprising a vortex chamber, there being an outlet from the vortex chamber, the first and second flow paths being discrete so that water entering the first flow path can only reach the second flow path by flowing entirely around said closed loop and re-entering the inlet zone, in which an inlet end of said closed loop is on the opposite side of said inlet zone from said inlet, an outlet end of the closed loop being located to one side of a line traversing the inlet zone and joining said inlet and said inlet end, water which, in use, flows from said outlet and intersecting water flowing from said inlet to said inlet end, and said second flow path communicating with said inlet zone between said inlet and an said outlet end and on the same side of said line as said outlet end.

10. A device according to claim 9, in which said closed loop encircles the vortex chamber and is spaced radially outwardly therefrom.

11. A pressure compensating water flow control device comprising a vortex chamber having an outlet, walls defining an inlet passage leading to the vortex chamber, said walls being tangential to the vortex chamber so that water flowing into said vortex chamber through the inlet passage swirls in the vortex chamber, and a flow path in the form of a closed loop having an inlet end and an outlet end, the inlet end of the closed loop communicating with said inlet passage so that water flows into said closed loop from the inlet passage, and in which the outlet end of the closed loop is bounded by walls extending substantially radially with respect to the axis of the vortex chamber and substantially at right angles to the walls defining the inlet passage so that water flowing from the closed loop traverses water flowing tangentially into the vortex chamber from the inlet passage.

* * * * *